(12) United States Patent
Collins

(10) Patent No.: US 7,873,220 B2
(45) Date of Patent: Jan. 18, 2011

(54) ALGORITHM TO MEASURE SYMMETRY AND POSITIONAL ENTROPY OF A DATA SET

(76) Inventor: Dennis G. Collins, Urb. Mayagüez Temaco, 6009 Calla R. Martinez Torres, Mayagüez, PR (US) 00582-8630

(*) Notice: Subject to any disclaimer, the term of this patent is extended or adjusted under 35 U.S.C. 154(b) by 971 days.

(21) Appl. No.: 11/715,909

(22) Filed: Mar. 9, 2007

(65) Prior Publication Data
US 2008/0159631 A1   Jul. 3, 2008

Related U.S. Application Data

(60) Provisional application No. 60/878,240, filed on Jan. 3, 2007.

(51) Int. Cl.
*G06K 9/52* (2006.01)
*G06K 9/62* (2006.01)

(52) U.S. Cl. .......... 382/203; 382/141; 382/201; 382/206; 382/216; 382/218

(58) Field of Classification Search ......... 382/141–152, 382/195, 199, 201, 203, 206, 209, 212, 216–222, 382/278, 294–298
See application file for complete search history.

(56) References Cited

U.S. PATENT DOCUMENTS

| | | | | |
|---|---|---|---|---|
| 3,196,397 A * | 7/1965 | Shelton, Jr. et al. | ......... | 382/205 |
| 4,424,588 A * | 1/1984 | Satoh et al. | ............... | 382/288 |
| 4,579,455 A * | 4/1986 | Levy et al. | ............... | 356/394 |
| 4,720,870 A | 1/1988 | Billiotte et al. | | |
| 5,189,711 A | 2/1993 | Weiss et al. | | |
| 5,191,524 A * | 3/1993 | Pincus et al. | ............... | 600/508 |
| 5,345,514 A * | 9/1994 | Mahdavieh et al. | ......... | 382/152 |
| 5,515,447 A | 5/1996 | Zheng et al. | | |
| 5,533,143 A * | 7/1996 | Takeo | ................. | 382/132 |
| 5,535,286 A | 7/1996 | Ibbotson et al. | | |
| 5,809,170 A | 9/1998 | Saito | | |
| 5,889,892 A * | 3/1999 | Saito | ................. | 382/293 |
| 5,926,568 A * | 7/1999 | Chaney et al. | .......... | 382/217 |
| 6,195,576 B1 | 2/2001 | John | | |

(Continued)

OTHER PUBLICATIONS

Pal, N.R.; Pal, S.K., "Entropy: a new definition and its applications," Sep./Oct. 1991, IEEE, Systems, Man and Cybernetics, IEEE Transactions on, vol. 21, No. 5, pp. 1260-1270.*

(Continued)

*Primary Examiner*—Vu Le
*Assistant Examiner*—Anthony Mackowey
(74) *Attorney, Agent, or Firm*—Lydia M. DeJesus

(57) ABSTRACT

A method and algorithm for measuring the symmetry (SYM=total symmetry) of N points based on counting the number of "elementary symmetric recognition acts", or having two distances d(A,B) and d(C,D) be equal within a given tolerance t. The same algorithm can be adapted to measure un-normalized positional entropy deficit (UPED) and positional entropy of N points. These parameters (SYM and UPED) come out almost the same for small occupation numbers ($1<=k<=4$). Here the occupation number k is the number of equal distances in the figure for a given value d. The algorithm can be incorporated into an imaging device, such as computer graphic programs or cameras, to solve problems of defect detection, say in gems, or object detection.

14 Claims, 7 Drawing Sheets

U.S. PATENT DOCUMENTS

| | | | |
|---|---|---|---|
| 6,198,847 B1* | 3/2001 | Washizawa | 382/228 |
| 6,240,208 B1 | 5/2001 | Garakani et al. | |
| 6,263,097 B1 | 7/2001 | Dewaele | |
| 6,389,169 B1* | 5/2002 | Stark et al. | 382/225 |
| 6,415,044 B1 | 7/2002 | Simpson et al. | |
| 6,611,615 B1* | 8/2003 | Christensen | 382/130 |
| 6,728,404 B1 | 4/2004 | Ono et al. | |
| 6,728,424 B1* | 4/2004 | Zhu et al. | 382/294 |
| 6,735,745 B2 | 5/2004 | Sarig | |
| 6,748,044 B2* | 6/2004 | Sabol et al. | 378/4 |
| 6,856,408 B2 | 2/2005 | Raymond | |
| 6,909,794 B2* | 6/2005 | Caspi | 382/128 |
| 6,954,700 B2 | 10/2005 | Higashida et al. | |
| 6,970,110 B1 | 11/2005 | Collins | |
| 6,993,452 B2* | 1/2006 | Huang et al. | 702/179 |
| 6,996,256 B2 | 2/2006 | Pavlidis | |
| 7,027,621 B1 | 4/2006 | Prokoski | |
| 7,409,085 B2* | 8/2008 | Hu et al. | 382/171 |
| 7,668,351 B1* | 2/2010 | Soliz et al. | 382/128 |
| 7,684,609 B1* | 3/2010 | Toth et al. | 382/141 |
| 2004/0062424 A1 | 4/2004 | Mariani et al. | |
| 2005/0069858 A1 | 3/2005 | Lapa et al. | |
| 2005/0128197 A1* | 6/2005 | Thrun et al. | 345/421 |
| 2005/0135679 A1 | 6/2005 | Yoon et al. | |
| 2005/0168460 A1 | 8/2005 | Razdan et al. | |
| 2005/0180160 A1 | 8/2005 | Nelson | |
| 2006/0135867 A1 | 6/2006 | Essock et al. | |
| 2006/0262994 A1* | 11/2006 | Patera et al. | 382/276 |
| 2007/0047789 A1* | 3/2007 | Dewaele | 382/128 |
| 2007/0276219 A1* | 11/2007 | K.N. et al. | 600/410 |
| 2008/0021502 A1* | 1/2008 | Imielinska et al. | 607/1 |
| 2008/0260254 A1* | 10/2008 | Schramm | 382/190 |
| 2008/0292194 A1* | 11/2008 | Schmidt | 382/217 |

OTHER PUBLICATIONS

Loy, G.; Eklundh, J.O., "Detecting Symmetry and Symmetric Constellations of Features," 2006, Springer, ECCV 2006, 9th European Conference on Computer Vision, Proceedings, Part II, Lecture Notes in Computer Science, vol. 3952, pp. 508-521.*

Lin, S.K., "Correlation of Entropy with Similarity and Symmetry," 1996, American Chemical Society, Journal of Chemical Information and Computer Sciences, vol. 36, pp. 367-376.*

Dinggang Shen; Ip, H.H.S.; Cheung, K.K.T.; Earn Khwang Teoh; , "Symmetry detection by generalized complex (GC) moments: a close-form solution," May 1999, Pattern Analysis and Machine Intelligence, IEEE Transactions on , vol. 21, No. 5, pp. 466-476.*

Zabrodsky, H.; Peleg, S.; Avnir, D.; , "Symmetry as a continuous feature," Dec. 1995, Pattern Analysis and Machine Intelligence, IEEE Transactions on , vol. 17, No. 12, pp. 1154-1166.*

Fan, J. and Xie, W., "Distance measure and induced fuzzy entropy" Jun. 1999, Fuzzy Sets and Systems, vol. 0104, Issue 2, pp. 305-314.*

Journel, A.; Deutsch, C., "Entropy and Spatial Disorder," Apr. 1993, Mathematical Geology, vol. 25, No. 3, pp. 329-355.*

Kazhdan, M.; Chazelle, B.; Dobkin, D.; Finkelstein, A.; Funkhouser, T., "A Reflective Symmetry Descriptor," 2002, Proceedings of the 7th European Conference on Computer Vision- Part II, Lecture Notes in Computer Science, vol. 2351, pp. 642-656.*

E. Yodogawa, "Symmetropy, an entropy-like measure of visual symmetry," 1982, Perception and Psychophysics, vol. 32, No. 3, pp. 230-240.*

Battino et al., Thermodynamics, Academic Press, 1968, p. 263.

Li et al., "Accurate Estimation of the Fischer Information Matrix for the PET Image Reconstruction Problem", IEEE Transac. on Med. Imaging, vol. 23, No. 9, Sep. 2004, pp. 1057-1064.

Migliavacca et al, "Analysis and Optimization of Gas-Centrifugal Separation of Uranium Isotopes by Neural Networks", Braz Journal of Chem. Eng., vol. 19, No. 3, Sep. 2002, pp. 29-306.

Gunawan et al., "Sensitivity Analysis of Discrete Stochastic Systems" http://cs.ucsb.edu/%7Eycao/publication/Gunawan%20biophysJ%202004.pdf, Apr. 2005.

Gustavsson, K., "Mathematical and Numerical Modeling of 1-D and 2-D Consolidation", Ph. D. Dissertation, Kungl Techniska Hogskolan, STockholm, Sweden, Apr. 2003.

Schultz, S., "Math Helps Explain Protein Folding", Princeton Weekly Bulleting, V89, No. 3, Sep. 1999.

Cover et al., Elements of Integration Theory, John Wiley & Sons, INc, 1995, pp. 234-236.

Seung et al., "Simple Models for reading Neuronal Population Codes", Proc. Natl. Acad. Sci, vol. 90, Nov. 1993, pp. 10749-10753.

Frieden et al, "Lagrangians of physics and the game of Fischer Information Transfer", Physcial Review E, vol. 52, No. 3, Sep. 1995, pp. 2274-2283.

Collins, Dennis, Measuring Continuous Symmetry and Positional Symmetry, General Systems Bulletin, 2008, pp. 20-22, vol. 37, International Society for the Systems Sciences.

Collins, Dennis, Examples of Measuring Continuous Symmetry, SIDIM XXIII Simposium, Feb. 29, 2008, University of Puerto Rico, Carolina, PR.

Collins, Dennis, Architecture Case Study in Transformity Factorization, 5th Biennial Energy Research Conference, Jan. 31, 2008, University of Florida, Gainesville, FL.

* cited by examiner

F1(x) = symmetry (k*(k-1)/2)
F2(x) = un-normalized positional entropy deficit (k*ln (k))

x = occupation # (k)

N Density for Positional Entropy

F(x) = occupation # x = distance between data points

Example of Translational Symmetry

Example of Reflection Symmetry x = distance between data points

ALGORITHM TO MEASURE SYMMETRY AND POSITIONAL ENTROPY OF A DATA SET

The present application claims the benefit of Provisional application Ser. No. 60/878,240, filed on Jan. 3, 2007.

BACKGROUND OF THE INVENTION

1. Field of the Invention

The present invention relates to data analysis by determining symmetry and related parameters within a set of N points, particularly in image analysis and fault detection applications.

2. Description of Related Art

Prior methods handle symmetry on a piece-meal basis, working separately with translational, mirror or rotational symmetry through the localizations of symmetry axes or centers, which must be calculated separately for each case. Mathematically, this procedure can lead to the complicated construction of various symmetry groups as outlined by Jablan (1995). Attempts to work with partial symmetry have led to even more complicated mathematical structures such as groupoids (cf. Weinstein and Johnson).

In a previous study by the inventor involving minimum laterally-adiabatically reduced Fisher information (see Collins 2005) which led to the development of the present method, the definition of "tropical" symmetric order is given as the "number of equal distances from each object, added together". It was further determined that working with reference distances could be avoided by counting numbers of pairs of equal distance, since one reference distance plus one equal distance counts as one pair of equal distances.

Alexander (2002) counts the number of "local symmetries" (pg. 189); however, this method appears to be infeasible for large N (taking exponential complexity) since it involves considering all subsets, plus there is no indication of how to count local symmetries in more than one dimension.

In the work of Kia, the term "distance entropy" occurs with respect to the "distance transform". This term differs from its use in the present invention since Kia refers to calculations involving edge effects.

As stated in the article by Reid (2006), most imaging problems can be solved at present by "proper knowledge, hardware, software, and tweaking . . . ". The present invention attempts to solve the problem of measuring symmetry of different types within a single data set simultaneously and allowing interchangeable symmetry calculations.

BRIEF SUMMARY OF THE INVENTION

The present invention provides the advantage of actually measuring symmetry by counting "elementary symmetric recognition acts" in such a way as to allow interchangeable symmetry calculations.

In the preferred embodiment, the algorithm of the present invention results in a computer program operable in response to an input of coordinates for each of a set of N points to produce measurements of symmetry and other related parameters, so as determine positional entropy of said set of points, said program comprising the steps of:
receiving said coordinates of each of said N points;
calculating a set of N(N−1)/2 pairs of distances within said points;
calculating local symmetry;
calculating global symmetry to determine a set of occupation numbers;
determining from said occupation number a total symmetry value and an un-normalized positional entropy deficit; and
determining a positional entropy value of said set of N points.

Said program may further be incorporated into algorithms for performing fault detection and image recognition based on the calculated local, global and total symmetry.

Said program is stored in a computer readable medium, such as a floppy disk, a hard disk drive, CD-ROM, DVD-ROM, or RAM, and other well known computer readable mediums.

BRIEF DESCRIPTION OF THE DRAWINGS

FIG. 3(A2) shows the density of positional entropy for the data set illustrated by FIG. 3(A1).

FIG. 3(B1) illustrates an example of a data set composed of a template and a sample.

FIG. 3(B2) shows the density of positional entropy for the data set illustrated by FIG. 3(B1).

DETAILED DESCRIPTION OF THE PREFERRED EMBODIMENTS

Figure 1:
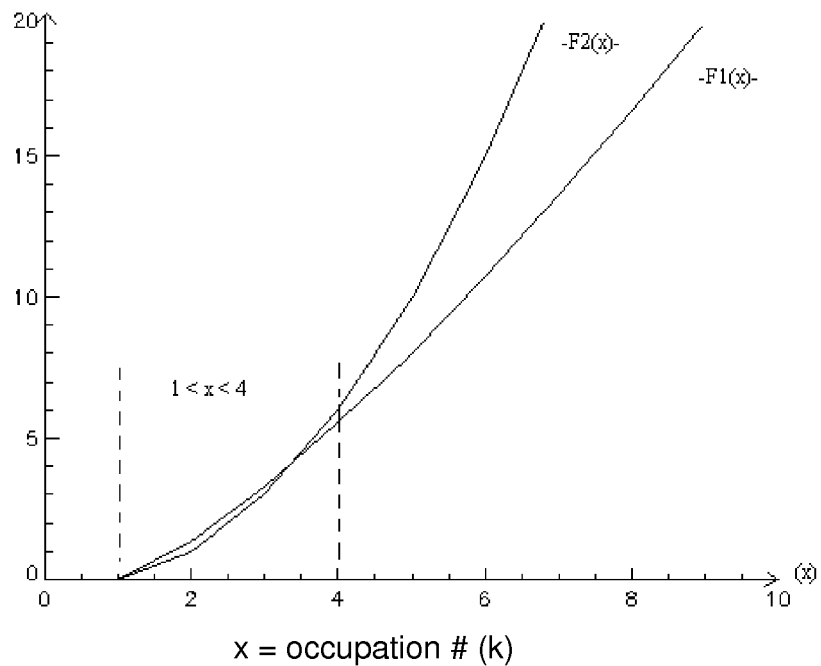
FIG. 1 illustrates the relationship between symmetry and un-normalized entropy deficit.

In the present method, N points are inputted in coordinate fashion in any dimension. The coordinates for said N points may be provided manually by an operator; transmitted automatically from an imaging device such as a camera or scanner; or retrieved from a storage device internal or external to the computer performing the algorithm. Furthermore, the coordinates may correspond to discrete points or they may be interpolated from a continuous function.

The method of measuring symmetry of said N points begins by calculating the set Of N(N−1)/2 pairs of distances. Then, it calculates local symmetry by ordering the distances from each given point and determining how many of them are of the same magnitude within the tolerance and adding over all points. Then, it calculates global symmetry (SYM) by considering all distances in one set and ordering them, eliminating every other one since d(A,B)=d(B,A), and determining once again how many distances are of the same magnitude within the tolerance t.

The resulting occupation numbers k are used to determine either the total SYM, which is calculated by adding $k*(k-1)/2$ over each k>1, or UPED, which is calculated by adding $k*\ln(k)$ over each k>1.

The positional entropy is then calculated by finding $[\ln(n*(n-1)/2) - \text{UPED}/(n*(n-1)/2)]$.

The method further includes the step of determining order within the set of N data points. "Order" is seen as seams of concentrated equal distances, somewhat like seams of ore in a mountain, which subtract from the maximum disorder $\ln(n*(n-1)/2)$. The normalized positional entropy deficit is UPED/$(n*(n-1)/2)$. A reason for working with UPED versus the normalized quantity is that if random points are added (that contribute no repeated distances) the UPED stays the same, whereas the normalized quantity decreases, somewhat as the ratio of ore to mountain depends on the size of the mountain. To find "seams" of similar figures (versus congruent figures as sought above), it is necessary to add another step of "refining the ore" by calculating the ratios of all the $n*(n-1)/2$ distances. Similar figures will show up as concentrations of ratios. For example, if one figure is twice as large as another, the ratios of corresponding sides will show up as a concentration of 2's (k>1 for r=2) in the set of all ratios.

The following is an example of algorithm of the present invention written in Mathematica™ programming language:

```
In[23]:= n=4
    t=.0001
    L={{2,0},{1,1},{2,1},{2,2}};
    T=Table[N[Sqrt[(L[[i]]−L[[j]])·(L[[i]]−L[[j]])]],{i,1,n},{j,1,n}];
    MatrixForm[T];
    R=Table[Sort[T[[i]],(#1<#2)&], {i,1,n}];MatrixForm[R];
    s=0
    Do[
    Do[If[Abs[R[[i,j]]−R[[i,k]]]<=t,s=s+1], {j,1,n},{k,1,n}],{i,1,n}]
        Print[(s−n^2)/2]
    Q=Flatten[R];MatrixForm[Q];
    P=Sort[Q,(#1<#2)&];MatrixForm[P];
    M=Table[P[[2*i+n]],{i,1,(n^2−n)/2}];MatrixForm[M]
    d=M[[1]];v=1;ent=0;
    Do[If[Abs[M[[i+1]]−M[[i]]]<=t,v=v+1,{Print[M[[i]], " ",v],
        ent=ent+v*Log[v], d=M[[i+1]],v=1}],{i,1(n^2−n)/2−1}]
    ent=ent+v*Log[v];
    Print[d," ",v]
    Print["UPED=",N[ent], " ENT=",N[Log[n*(n-1)/2]−ent/
    (n*(n-1)/2)]]
    u=0
    Do[If[Abs[M[[i]]−M[[j]]]<=t,u=u+1],
        {i,1,(n^2−n)/2},{j,1,(n^2−n)/2}]; Print[(u−(n^2−n)/2)/2]
    W=Table[If[M[[i]]!=0,M[[j]]/M[[i]],10^4],
        {i,1,(n^2−n)/2},{j,1,(n^2−n)/2}];MatrixForm[W];
    X=Flatten[W];MatrixForm[X];
    Y=Sort[X,(#1<#2)&];MatrixForm[Y];
    Z=Table[Y[[i+(n^2−n)*(n^2−n+2)/8]],{i,1,(n^2−n)*(n^2−n−2)/8}];
    MatrixForm[Z];
```

The algorithm set forth above calculates local symmetry, total symmetry (=SYM=symmetry) and un-normalized positional entropy deficit (UPED), and positional entropy of N points. The program also calculates ratio symmetry distributions, from which ratio versions of above quantities can be calculated by adapting previous program statements. The version depends on the "Flatten" and "sort" commands.

Figure 3:
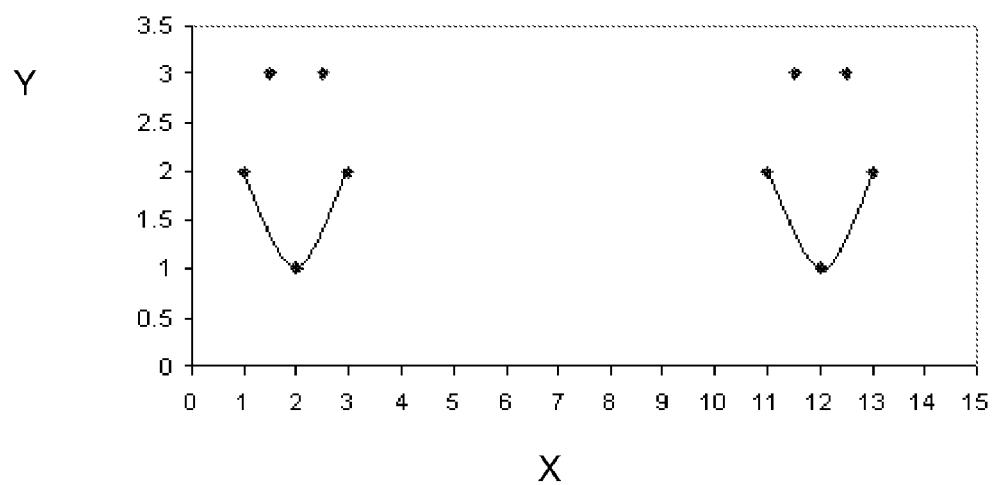
FIG. 3(A1) illustrates an example of a data set composed of a double template.
Figure 3:
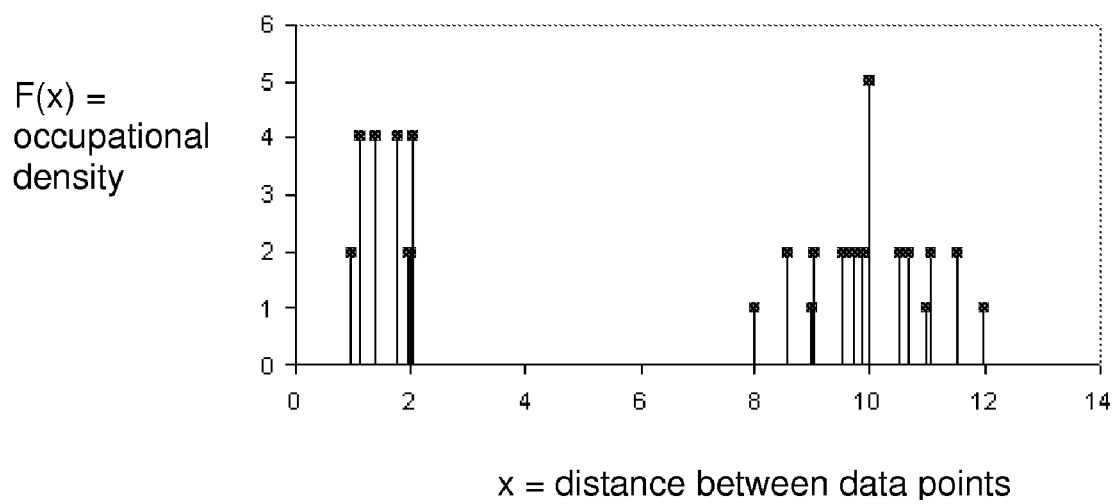
Figure 3:
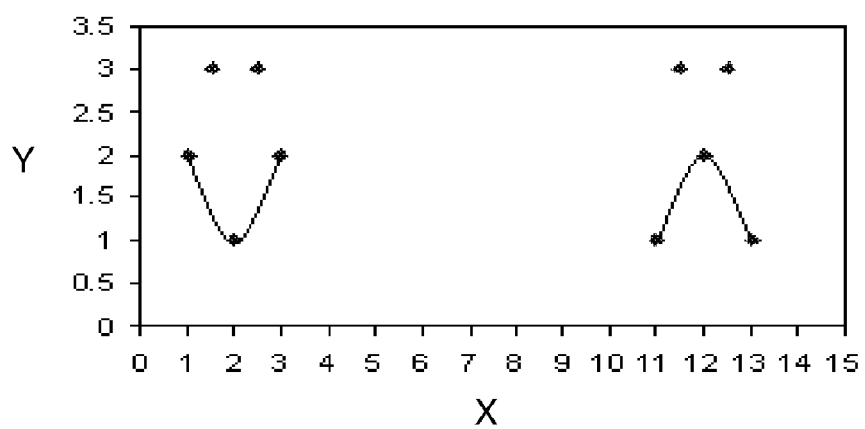
Figure 3:
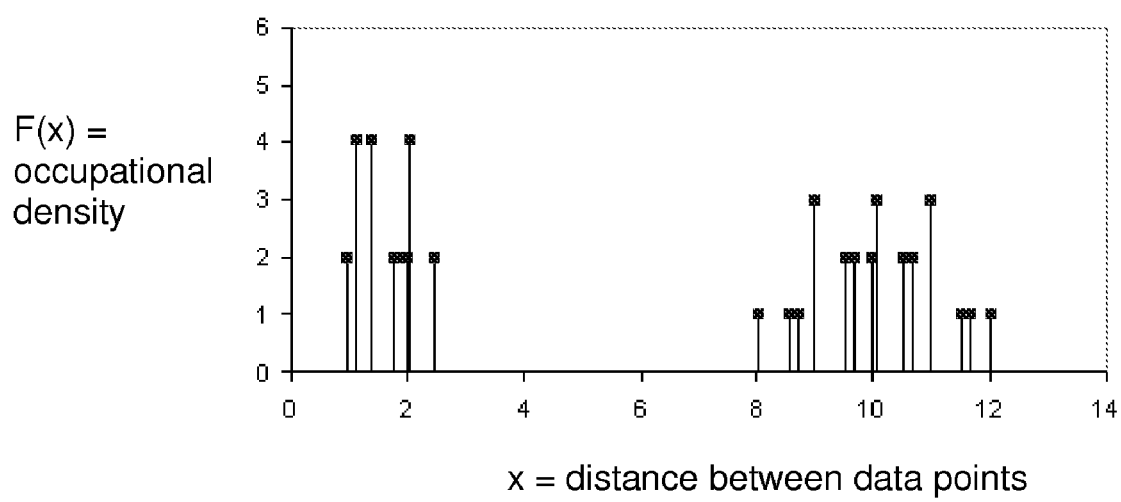

In the preferred embodiment, the method of measuring symmetry of the present invention is incorporated into an image analysis system for the purpose of determining symmetry within an image in order to identify its contents or, conversely, to identify dissimilarities such as a fault in a sample when compared with a template. See FIGS. 3(A1) and 3(B1).

For many simple geometric figures, which is to say figures for which the resulting occupation numbers k from the data set representing the figure are between 1 and 4, the two functions $k*(k-1)/2$ and $k*\ln(k)$ are nearly equal as shown in FIG. 1. Thus, for this case symmetry and un-normalized entropy deficit will be nearly equal, which provides a link between order as measured by symmetry and order as measured by un-normalized positional entropy deficit. It remains to be seen which function will prove to be more valuable in different applications; the algorithm calculates both quantities. SYM calculates the same symmetry measure for a figure and its mirror image, and for a figure and its (un-rotated) translation, whereas UPED calculates somewhat different values, as illustrated in FIGS. 2, 2(A) and 2(B).

Figure 2:
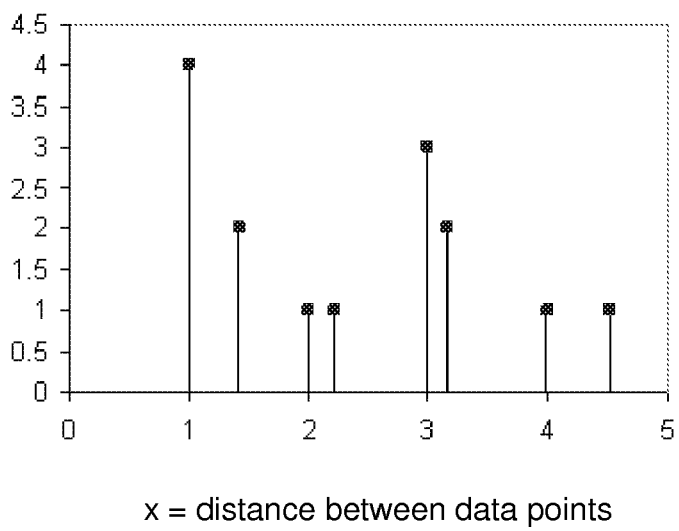
FIG. 2 shows the N density of positional entropy for the data set represented in FIG. 2(A) to illustrate the application of present invention in determining of translation symmetry.
Figure 2A:
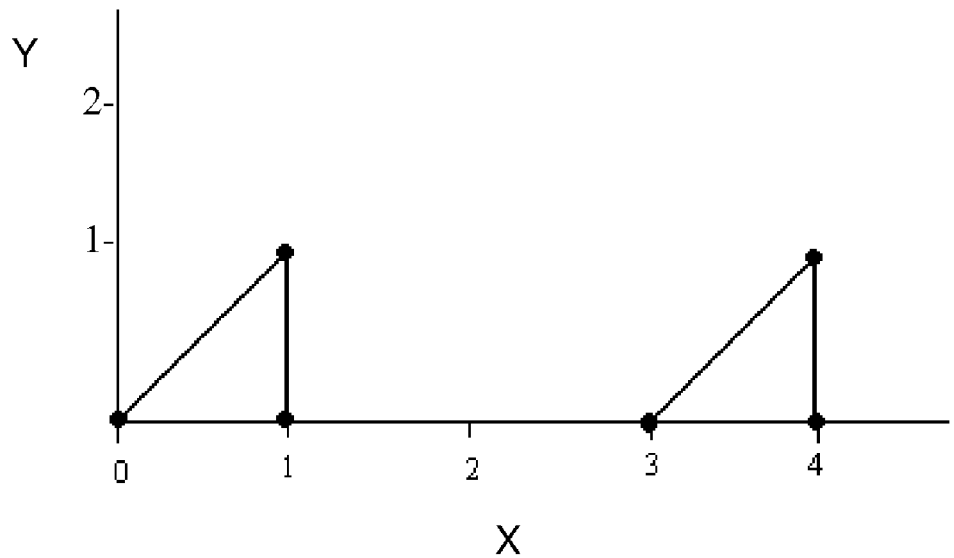
FIG. 2(A) illustrates an example of a data set having translational symmetry.
Figure 2B:
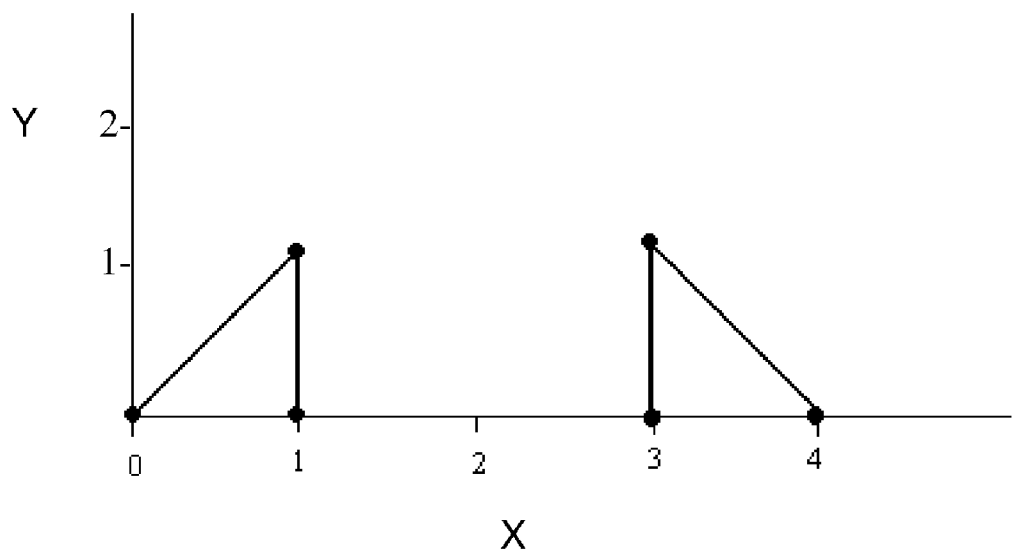
FIG. 2(B) illustrates an example of a data set having reflection symmetry.

FIG. 2 shows the resulting density for positional entropy for the following set of N data points:

N=6, L={(0,0),(1,0),(1,1),(3,0),(4,0),(4,1)}

The calculated symmetry parameters from said set data points are: SYM=11, UPED=11.61, PENT=1.93. A plot of said coordinates is presented in FIG. 2(A).

Notice, however, that altering a single point within the set, as shown in FIG. 2(B) alters the value of UPED even when the measure of symmetry for the data set is unchanged. For example, if the last data point is changed to coordinates (3,1) to demonstrate in this case reflection symmetry, the new set is given by:

N=6, L={(0,0),(1,0)(1,1),(3,0),(4,0),(3,1)}

Now, SYM=11 and PENT=1.87, which is close to the previous value, whereas the un-normalized positional entropy deficit increases to UPED=12.47.

Due to the similarity of this relationship between symmetry and un-normalized entropy deficit in data sets having occupation numbers ranging from 1 to 4, the present invention may also be adapted for use in Graph theory. If all the distances are assumed to be one unit, in other words scaled down to value of 1, the value of symmetry would be given by SYM=(e*(e−1)/2), e being the number of edges of the figure, so there is full possible symmetry for all edges. This is particularly useful for incomplete data sets, such as a table with missing values or a polygon missing a portion of its outline.

Returning to FIGS. 3(A1) through 3(B2), these illustrate the application of the present invention in image recognition and defect detection problems. The symmetry of the template together with another template can be calculated and compared with the symmetry of the template together with the (possibly defective) sample.

In the example shown, the data set for the double template is:

N=10, L={(1,2),(2,1),(3,2),(1.5,3),(2.5,3),(11,2),(12,1),(13,2),(11.5,3),(12.5,3)}

Whereas, the template with the sample is represented by the data set:

N=10, L={{(1,2),(2,1),(3,2),(1.5,3),(2.5,3),(11,1),(12,2),(13,1),(11.5,3),(12.5,3)}

The symmetry of the double template, SYM=44, which represents a local maximum of symmetry, such that any (relatively minor) change in the sample will significantly decrease the combined symmetry of the template with the sample, in this case the total symmetry has a value of SYM=36, indicating a potential defect.

Similarly, the value for UPED in the double template data set is 44.09, while the same parameter decreases to 38.99 for the template compared to the sample.

Figure 4A:
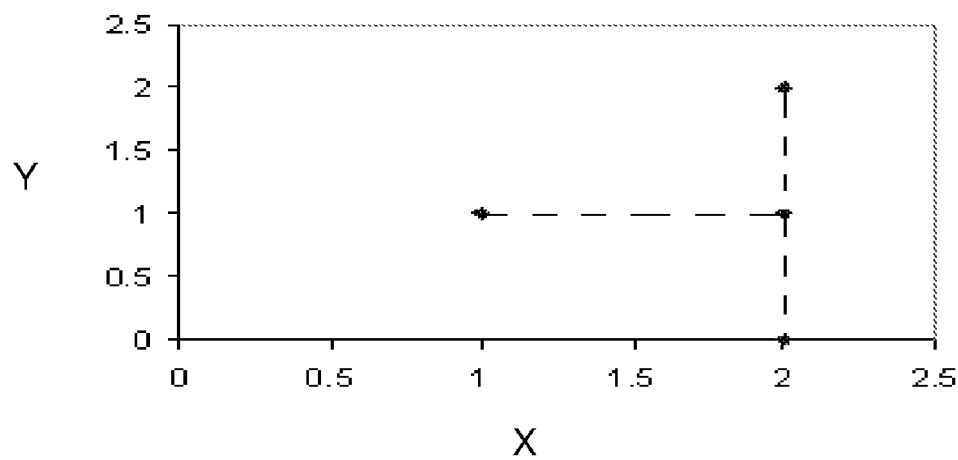
FIGS. 4(A) through 4(C) illustrate an example of the use of synergy to determine symmetry between a composite of two sets of data to another data set, in industrial positioning applications of the present invention.
Figure 4B:
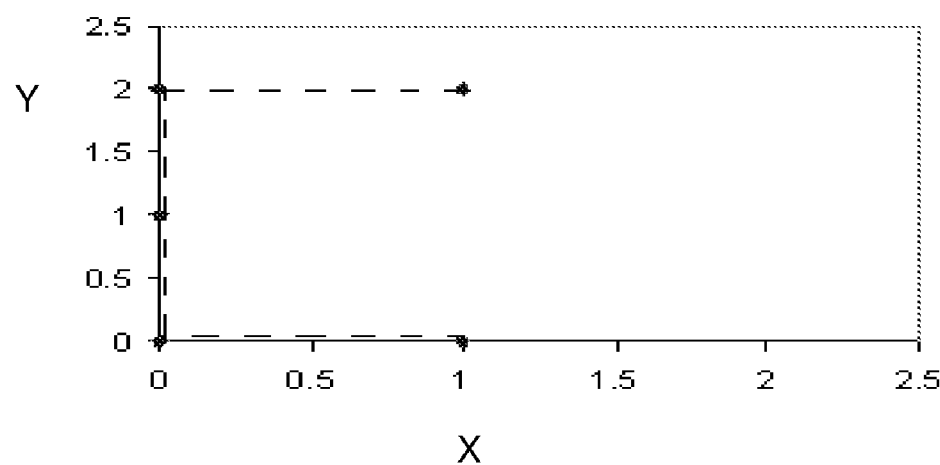
Figure 4C:
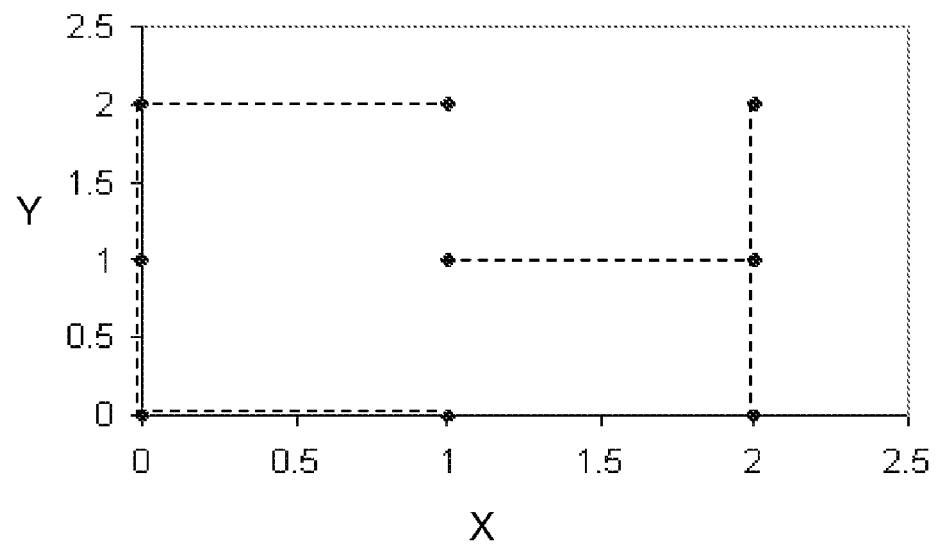

FIGS. 4(A)-4(C) show a further embodiment of the present invention adapted to industrial positioning problems, as well as lock-and-key type fits involved in olfactory recognition and protein folding. The symmetry goes way up when a proper fit is obtained; the ratio of the final symmetry to the sum of the symmetries of the components may be termed the "synergy" of the fit. In other words, synergy is the symmetry of the output divided by the sum of the input symmetry. If the data set is composed by combining at least two subsets, then the synergy of the data set is equal to the symmetry of the composite data set divided by the sum of the symmetry values for each individual subset. In this case, when the separate components illustrated in FIGS. 4(A) and 4(B) are fitted correctly, as indicated by the synergy of this proper fit, the combination will result in a high symmetry value with respect to the data set of FIG. 4(C).

Figure 5A:
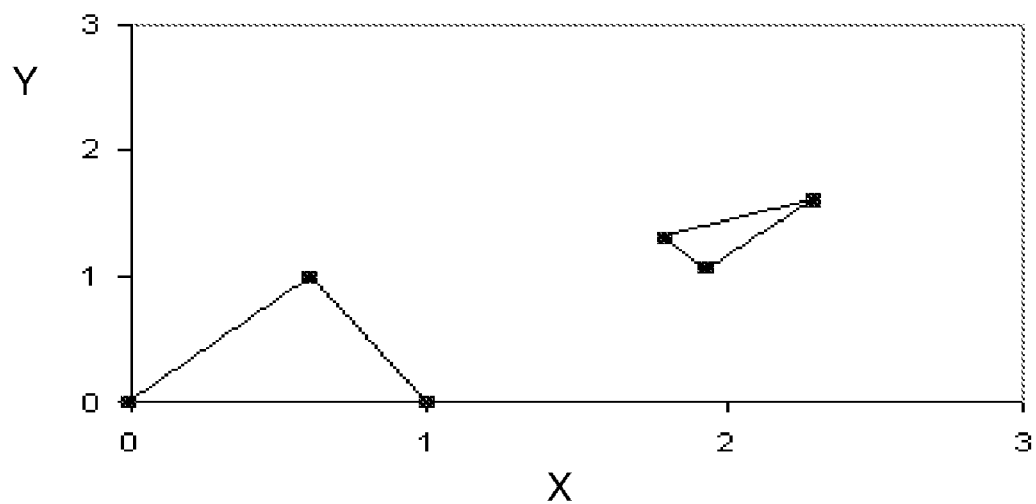
FIG. 5(A) illustrates an example of a data set representing similar figures at different scales.
Figure 5B:
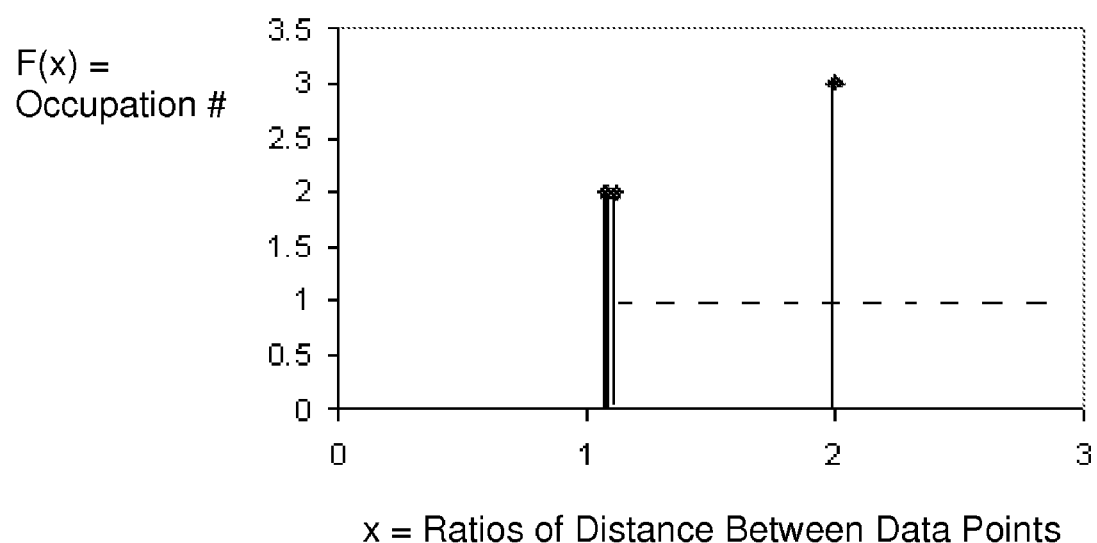
FIG. 5(B) shows the density of positional entropy for the data set illustrated by FIG. 5(A).

FIGS. 5(A) and 5(B) show how "refining the ore" by calculating C(n*(n−1)/2,2) ratios(>=1) and studying the occupation numbers permits detection of similar figures even at different scales. This feature allows for example, verifying the accuracy of a magnified image or pattern by evaluating the symmetry and UPED resulting from the set of points representing the image, even if the image is scaled and/or rotated. In this case, the rotational symmetry results in a value of 6 and the value for rotational UPED is 7.454. The dashed line represents a high population of occupation numbers corresponding to distances between points within the data set all being equal to 1, ranging from 1 to about 9.178. This embodiment is highly useful in detecting similarities.

As described above, the apparatus would allow the user to enter sets of points, either directly or by manipulating input images, then move the sets around by currently-available graphics commands, and calculate the resulting symmetry in real time by the algorithm to solve problems involving recognition, defect detection and positioning.

Another application of these commands is a very simple version of the probability centrifuge algorithm of Collins, U.S. Pat. No. 6,970,110, which is incorporated herein by reference. In this application the probability centrifuge algorithm of a multidimensional set is carried out by flattening the set of function values, then sorting it, then interpolating and integrating it. It is only necessary to contract the x-axis of the one-dimensional set by the integral value to obtain a probability centrifuge density (with integral value 1).

These commands may be added to the previous algorithm to approximate symmetry calculations for continuous data by providing the program with the function and the desired number N of points to be selected from said function to apply the algorithm. In that case, the program will include the step of interpolating at N points, equally spaced along a figure, corresponding to values of said function, as determined by the limits selected for the function and the number N of the data set.

Said program is stored in a computer readable medium, such as a floppy disk, a hard disk drive, CD-ROM, DVD-ROM, or RAM, and other well known non-transitory computer readable mediums.

The results of the algorithm of the present invention may provide helpful alternate information for problems such as image reconstruction, due to the fact that, for example in tomography, radiation may be collected on a wall behind a sample, whereby higher densities of sample contribute less radiation, so that higher "probability density" correlates with less radiation received on the collecting or detecting wall (Cf. Li 2004). There the problem is reverse to the invention discussed, namely the interest there is minimizing information loss, going from the collected density in the wall back to the original density of the sample.

Further applications may be in problems such as protein folding, wherein current algorithms attempt to minimize energy, apparently without reference to the thermodynamic constraint of constant entropy (Cf. Schultz 1999).

While the present invention has been shown and described herein in what are conceived to be the most practical and preferred embodiments, it is recognized that departures, modifications, adaptations, variations and alterations in the described algorithm may be made and will be apparent to those skilled in the art of the foregoing description which does not depart from the spirit and scope of the invention which is therefore not to be limited to the details herein.

What is claimed is:

1. A non-transitory computer readable medium storing a program for determining positional entropy of a set of N points resulting from a measurement, said program comprising the steps of:
receiving coordinates for each of said N points;
calculating a set of a maximum of N(N−1)/2 pairs of distances within said points;
calculating local symmetry;
calculating global symmetry to determine a set of occupation numbers;
determining a total symmetry and an un-normalized positional entropy deficit for said points from said occupation numbers; and
determining a positional entropy value of said set of N points.

2. The program of claim 1, wherein said data points are received as discrete coordinate points.

3. The program of claim 1, further comprising the step of determining the order for said set of N points.

4. The program of claim 1, wherein said set of N data points consists of a combination of at least two data subsets, said program further comprising the steps of:
determining total symmetry values for each of said data subsets;
determining synergy of said data points by dividing the total symmetry of said set of N data points by a sum of the total symmetry values for each of said data subsets; and
evaluating, based on the synergy, if said combination of data subsets is a lock-and-key fit.

5. The program of claim 1, wherein the step of receiving said coordinates for each of said N points further comprises the steps of:
receiving a continuous function;
interpolating coordinates of N points within said function; and
creating said set of N points from said interpolated coordinates.

6. The program of claim 5, further comprising the step of determining order for said set of N points.

7. The program of claim 5, wherein said set of N data points comprise a combination of at least two data subsets, said program further comprising the steps of:
determining total symmetry values for each of said data subsets; and
determining synergy of said data points by dividing the total symmetry of said set of N data points by a sum of the total symmetry values for each of said data subsets.

8. A method for image analysis, comprising the steps of:
capturing an image with an imaging apparatus;
transforming said image into a set of N data points;
transmitting said data points to a non-transitory computer readable medium storing a program for determining positional entropy of said set of N points;
executing said program, comprising the steps of:
receiving coordinates for each of said N points;
calculating a set of a maximum of N(N−1)/2 pairs of distances within said points;
calculating local symmetry;
calculating global symmetry to determine a set of occupation numbers;

determining a total symmetry and an un-normalized positional entropy deficit of said points from said occupation numbers;

determining a positional entropy value of said set of N points; and evaluating at least one characteristic of said image based on the calculated total symmetry and positional entropy value of said set of N points.

9. The method of claim 8, further comprising the step of determining order for said set of N points.

10. The method of claim 8, further comprising the step of determining synergy of said data points.

11. The method recited in claim 9, wherein said characteristic comprises rotational symmetry between a pair of regions within said image, said method further comprising the step of identifying rotational symmetry within said regions based on said order.

12. The method recited in claim 9, wherein said characteristic comprises scalable symmetry between a pair of regions within said image, said method further comprising the steps of:

identifying scalable symmetry between said regions based on said order; and identifying said regions as copies in different scales.

13. The method recited in claim 8, wherein said image represents the combination of a template and a sample, said characteristic comprises dissimilarities between the image and at least one stored template, and said method further comprises the step of identifying said dissimilarities based on said total symmetry and positional entropy of said set of points.

14. The method recited in claim 9, wherein said image represents the combination of a template and a sample, said characteristic comprises a difference between said total symmetry of said set of N points and a pre-selected reference symmetry value, and said method further comprises the step of identifying a fault in said sample based on said difference between said total symmetry and said pre-selected reference symmetry value.

* * * * *

UNITED STATES PATENT AND TRADEMARK OFFICE
CERTIFICATE OF CORRECTION

| | | |
|---|---|---|
| PATENT NO. | : 7,873,220 B2 | Page 1 of 1 |
| APPLICATION NO. | : 11/715909 | |
| DATED | : January 18, 2011 | |
| INVENTOR(S) | : Dennis G. Collins | |

It is certified that error appears in the above-identified patent and that said Letters Patent is hereby corrected as shown below:

On the Title Page, Item (76), the inventor's mailing address should read:

Urb. Mayagüez Terrace
6009 Calle R. Martinez Torres
Mayagüez, PR (US) 00682-6630

Signed and Sealed this
Fifteenth Day of March, 2011

David J. Kappos
*Director of the United States Patent and Trademark Office*